(12) United States Patent
Kondo et al.

(10) Patent No.: US 11,097,650 B2
(45) Date of Patent: Aug. 24, 2021

(54) INTEGRATED LAMP-AND-CAMERA MODULE

(71) Applicant: KOITO MANUFACTURING CO., LTD., Tokyo (JP)

(72) Inventors: Masayuki Kondo, Shizuoka (JP); Hikaru Nagai, Shizuoka (JP); Masaru Sakai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/468,352

(22) PCT Filed: Dec. 5, 2017

(86) PCT No.: PCT/JP2017/043684
§ 371 (c)(1),
(2) Date: Jun. 11, 2019

(87) PCT Pub. No.: WO2018/123474
PCT Pub. Date: Jul. 5, 2018

(65) Prior Publication Data
US 2020/0171998 A1    Jun. 4, 2020

(30) Foreign Application Priority Data
Dec. 28, 2016    (JP) .............................. JP2016-255601

(51) Int. Cl.
*B60Q 1/00* (2006.01)
*B60Q 1/56* (2006.01)
(Continued)

(52) U.S. Cl.
CPC ............. *B60Q 1/0017* (2013.01); *B60Q 1/56* (2013.01); *B60R 11/04* (2013.01); *B60S 1/54* (2013.01);
(Continued)

(58) Field of Classification Search
USPC ......................................................... 396/429
See application file for complete search history.

(56) References Cited

U.S. PATENT DOCUMENTS 9,329,268 B2 * 5/2016 Luft ........................ B60R 11/04
2004/0124659 A1 * 7/2004 Vaitus .................... B60Q 1/302
296/106
(Continued)

FOREIGN PATENT DOCUMENTS

FR    2 875 473 A1    3/2006
JP    3121535 U    5/2006
(Continued)

OTHER PUBLICATIONS

International Search Report for PCT/JP2017/043684 dated Mar. 6, 2018 [PCT/ISA/210].

*Primary Examiner* — Rodney E Fuller
(74) *Attorney, Agent, or Firm* — Sughrue Mion, PLLC

(57) ABSTRACT

An integrated lamp-and-camera module (1) includes: a pair of license plate lamps (10R, 10L) that are disposed in a left-right direction of a license plate (LP) of a vehicle (VE), and apply light to the license plate (LP); a first camera (20) and a second camera (30) that are disposed between the pair of license plate lamps (10R, 10L) to capture an image of a rear side of the vehicle (VE); and a housing (70) to which the respective license plate lamps (10R, 10L), the first rear view camera (20), and the second camera (30) are attached. The housing (70) is attached to a vehicle body.

4 Claims, 6 Drawing Sheets

(51) Int. Cl.
*B60R 11/04* (2006.01)
*B60S 1/54* (2006.01)
*G02B 27/00* (2006.01)
*B60R 11/00* (2006.01)

(52) U.S. Cl.
CPC .... *G02B 27/0006* (2013.01); *B60R 2011/004* (2013.01)

(56) References Cited

U.S. PATENT DOCUMENTS

| | | | |
|---|---|---|---|
| 2006/0171704 A1* | 8/2006 | Bingle | B60R 11/04 396/419 |
| 2007/0013207 A1* | 1/2007 | Guernalec | B60R 11/04 296/146.8 |
| 2007/0216770 A1* | 9/2007 | Chang | H04N 7/183 348/148 |
| 2009/0129112 A1* | 5/2009 | Shamitz | B60Q 1/56 362/549 |
| 2009/0153663 A1* | 6/2009 | Ramos | H04N 5/2256 348/148 |
| 2011/0266375 A1* | 11/2011 | Ono | B60S 1/54 239/589 |
| 2014/0060582 A1* | 3/2014 | Hartranft | B60S 1/528 134/18 |
| 2014/0104424 A1* | 4/2014 | Zhang | H04N 5/23238 348/148 |
| 2014/0176713 A1* | 6/2014 | Ho | G02B 7/14 348/148 |
| 2015/0203076 A1* | 7/2015 | Irie | B60S 1/0848 134/56 R |
| 2015/0203077 A1* | 7/2015 | Gokan | H04N 5/2171 134/36 |
| 2015/0353024 A1* | 12/2015 | Cooper | B60S 1/0848 348/148 |
| 2016/0034771 A1* | 2/2016 | Schamp | G06K 9/00805 348/148 |
| 2016/0107571 A1* | 4/2016 | Dellock | B60R 1/00 348/148 |
| 2017/0036647 A1* | 2/2017 | Zhao | B08B 3/02 |
| 2017/0297536 A1* | 10/2017 | Giraud | B60S 1/56 |
| 2017/0313286 A1* | 11/2017 | Galera | B60S 1/54 |
| 2018/0126921 A1* | 5/2018 | Koseki | B60S 1/52 |
| 2019/0337490 A1* | 11/2019 | Kawamura | B08B 3/02 |

FOREIGN PATENT DOCUMENTS

| | | |
|---|---|---|
| JP | 2007-145048 A | 6/2007 |
| JP | 2009-083730 A | 4/2009 |

* cited by examiner

INTEGRATED LAMP-AND-CAMERA MODULE

CROSS REFERENCE TO RELATED APPLICATIONS

This application is a National Stage of International Application No. PCT/JP2017/043684 filed Dec. 5, 2017, claiming priority based on Japanese Patent Application No. 2016-255601 filed Dec. 28, 2016.

TECHNICAL FIELD

The present invention relates to an integrated lamp-and-camera module, and more particularly to an integrated lamp-and-camera module which facilitates attachment of a license plate lamp and a rear view camera to a vehicle body.

BACKGROUND ART

A license plate lamp is known as a lamp which applies light to a license plate disposed in a rear part of a vehicle. A rear view camera is also known as a camera which captures an image of a rear side of a vehicle when the vehicle moves backward. Patent Literature 1 presented below describes a state that a pair of license plate lamps and a rear view camera disposed between these license plate lamps are mounted on a vehicle.

Patent Literature 1 describes that the license plate lamps and the rear view camera are fixed inside an eave of a trunk lid. Specifically, a molding is provided on the eave above the license plate. The license plate lamps and the rear view camera are fixed to a position overlapping the molding.
[Patent Literature 1] JP2007-145048 A

SUMMARY OF INVENTION

In case of the above arrangement of the license plate lamps and the rear view camera fixed inside the eave of the trunk lid, or a back camera or the like, conceivable is such a configuration that the license plate lamps and the rear view camera are attached to an outer panel of the vehicle. The license plate lamps and the rear view camera attached in this manner are covered by a design part such as a molding and a garnish as much as possible to prevent easy visual recognition of the license plate lamps and the rear view camera.

The license plate lamps and the rear view camera directly attached to the outer panel of the vehicle in the foregoing manner need to be individually attached to the outer panel. In general, the outer panel is in a state integrated with a chassis when the license plate lamps and the rear view camera are attached to the outer panel. Accordingly, a worker tends to have an uncomfortable posture when attaching the license plate lamps and the rear view camera.

Accordingly, an object of the present invention is to provide an integrated lamp-and-camera module which facilitates attachment of a license plate lamp and a rear view camera to a vehicle body.

For achieving the aforementioned object, an integrated lamp-and-camera module of the present invention is characterized by comprising: a pair of license plate lamps that are disposed in a left-right direction of a license plate of a vehicle, and apply light to the license plate; at least one rear view camera that is disposed between the pair of license plate lamps, and captures an image of a rear side of the vehicle; and a housing to which the respective license plate lamps and the rear view camera are attached, the housing being attached to a vehicle body.

According to the integrated lamp-and-camera module thus configured, the housing to which the pair of license plate lamps and the rear view camera are attached can be attached to the vehicle body. Accordingly, as compared with a configuration which separately attaches the pair of license plate lamps and the rear view camera to the vehicle body, attachment of the license plate lamps and the rear view camera to the vehicle body can be facilitated.

In addition, the two rear view cameras are preferably provided. One of the rear view cameras is preferably a first camera that captures an image of a rear situation of the vehicle when the vehicle moves backward. The other rear view camera is preferably a second camera that captures an image of the rear situation of the vehicle when the vehicle moves forward.

The first camera and the second camera are disposed between the pair of license plate lamps. In this case, the two cameras are allowed to be disposed in the vicinity of the central portion of the housing. The license plate is generally disposed at the center of the vehicle in the left-right direction. In this case, the integrated lamp-and-camera module also tends to be disposed at the center of the vehicle in the left-right direction. Accordingly, in case of the above configuration, the first camera and the second camera are allowed to be disposed in the vicinity of the center of the vehicle in the left-right direction.

In this case, the first camera and the second camera are preferably disposed on one and the other sides opposite to each other, respectively, with respect to a center of the housing in the left-right direction.

According to this configuration, the first camera and the second camera, which are disposed on the sides opposite to each other, can be located closer to the center of the vehicle in the left-right direction than in a case where both the first camera and the second camera are disposed on one side of the housing with respect to the center line. Accordingly, a difference between images captured by the first camera and by the second camera can be reduced.

In addition, a cleaner that blows air onto an imaging surface of at least the one rear view camera is preferably further provided. The cleaner preferably includes a pump that feeds air to a blowout port for air blowout. The pump is preferably attached between the pair of license plate lamps in the housing.

When water droplets, dust or the like adhere to the rear view camera which captures an image of a rear situation, an image desired to be projected may not be obtained. Accordingly, these water droplets, dust and the like need to be removed. One of examples of removing means is a cleaner which blows air onto the imaging surface of the rear view camera. This cleaner has a pump which feeds air to a blowout port for air blowout. The pump is attached between the pair of license plate lamps. This arrangement reduces the distance between the rear view camera and the pump. In this case, a pressure loss of air in a pipe connecting the pump and the blowout port decreases. Accordingly, compression of air within this pipe decreases, therefore an appropriate amount of air can be blown out through the blowout port.

In this case, the two rear view cameras are preferably disposed in line with each other. One of the rear view cameras is preferably a first camera that captures an image of a rear situation of the vehicle when the vehicle moves backward. The other rear view camera is preferably a second camera that captures an image of the rear situation of the vehicle when the vehicle moves forward. The pump is preferably disposed on the side opposite to the first camera with respect to the second camera.

An image showing the rear situation of the vehicle and captured by the second camera during forward movement of the vehicle can be projected on a monitor device disposed in the interior of the vehicle and provided in place of a rearview mirror or side mirrors. The vehicle moves forward in a normal condition, and moves backward only temporarily. In this case, the imaging surface of the second camera is cleaned more frequently than the imaging surface of the first camera. The pump is disposed on the side opposite to the first camera side with respect to the second camera. In this arrangement, the distance between the pump and the second camera can be made smaller than that distance in the case where the pump is disposed on the side opposite to the second camera side with respect to the first camera. Accordingly, a more appropriate blowout amount can be produced for cleaning the imaging surface of the second camera which is more frequently used.

As described above, provided according to the present invention is an integrated lamp-and-camera module which facilitates attachment of a license plate lamp and a rear view camera to a vehicle body.

DESCRIPTION OF EMBODIMENTS

Described hereinafter in conjunction of the appended drawings is an embodiment of an integrated lamp-and-camera module according to the present invention. The embodiment is presented hereinafter by way of example to help easy understanding of the present invention. It should not therefore be interpreted that the present invention is limited to the embodiment described herein. Modifications and improvements of the following embodiment of the present invention may be made without departing from the scope and spirit of the invention.

Figure 1:
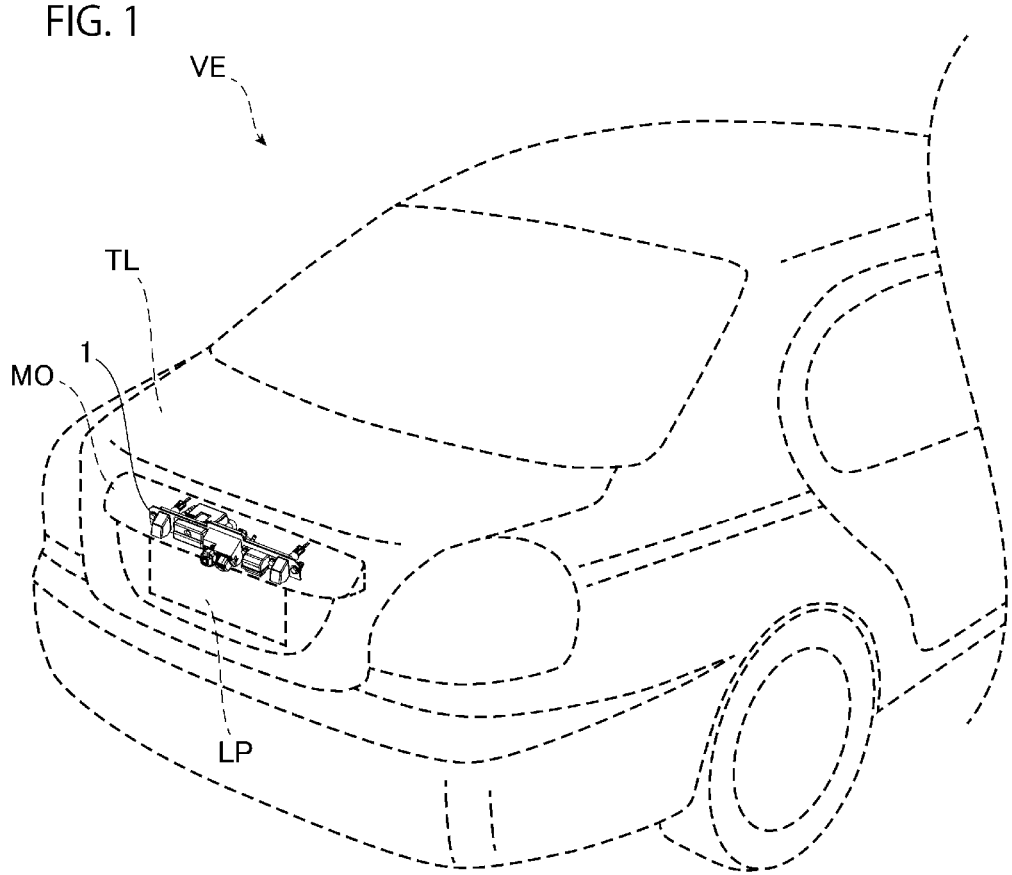
FIG. 1 is a view showing a state of an integrated lamp-and-camera module attached to a vehicle according to an embodiment of the present invention.

FIG. 1 is a view showing a state that an integrated lamp-and-camera module is attached to a vehicle according to the present embodiment. Note that FIG. 1 indicates a vehicle VE by a broken line for easy understanding. According to the present embodiment, a trunk lid TL forming a not-shown trunk room is integrated with the vehicle VE in a range from an upper surface to a rear side surface of a rear part of the vehicle VE as shown in FIG. 1. A license plate LP is attached to the rear side surface of the trunk lid TL. In addition, a molding MO coated with silver plating or the like is provided on an upper part of the license plate LP. An integrated lamp-and-camera module of the present embodiment is attached to a position almost invisible behind the molding MO.

Figure 2:
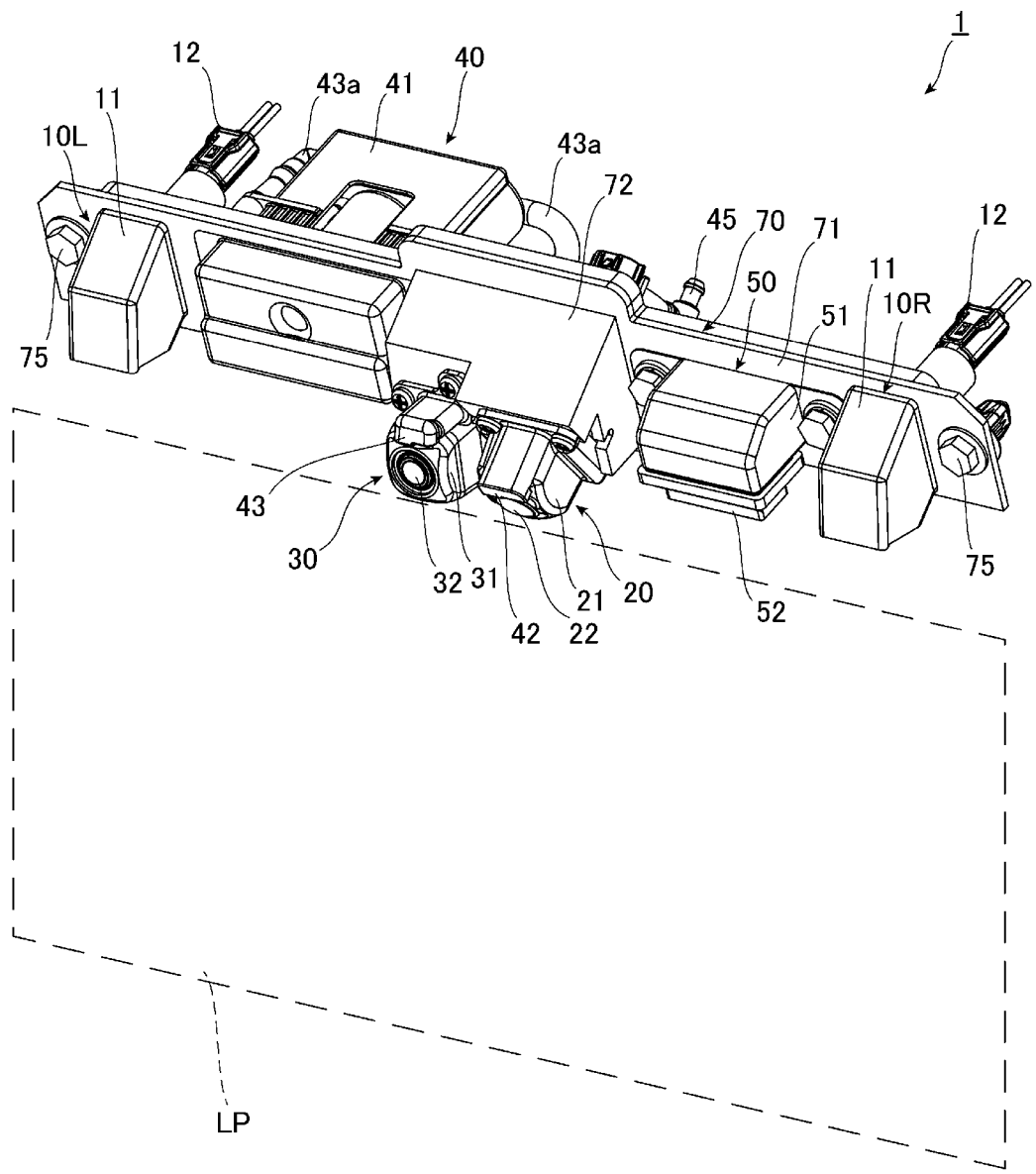
FIG. 2 is a perspective view showing the integrated lamp-and-camera module.
Figure 3:
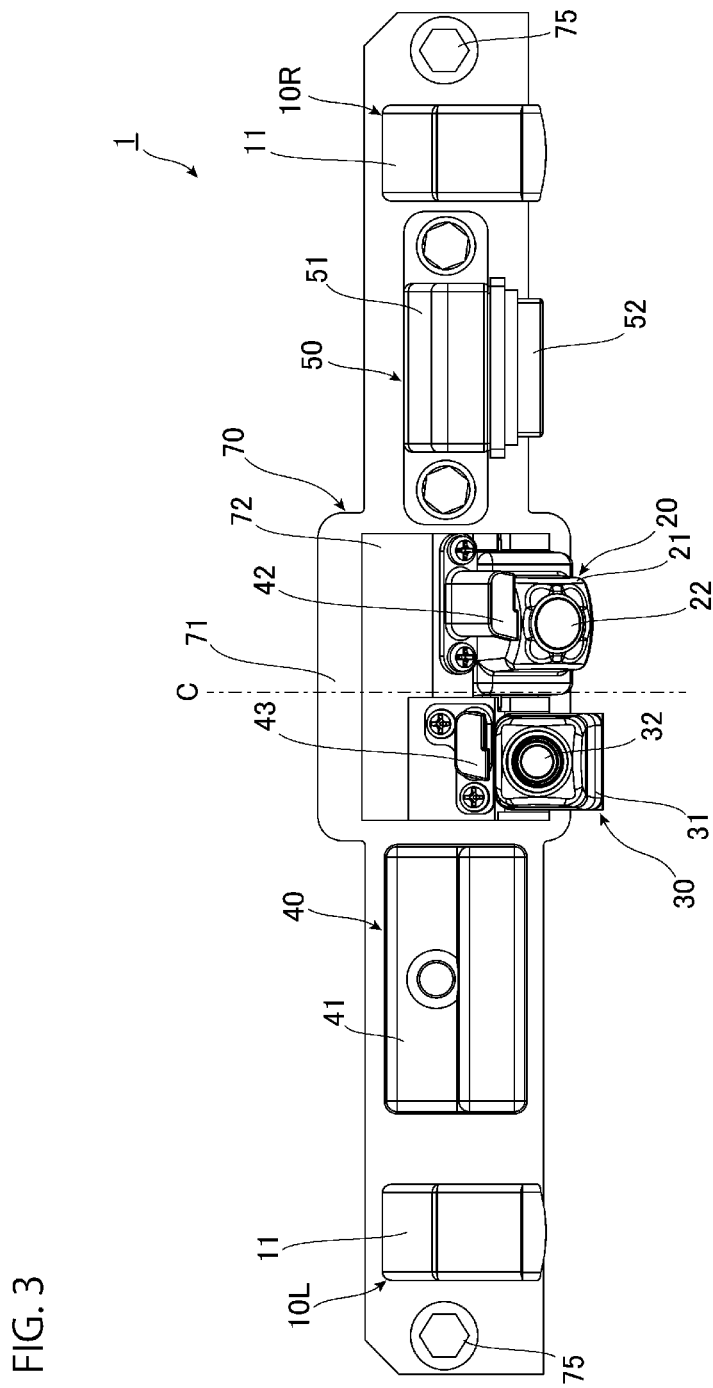
FIG. 3 is a front view of the integrated lamp-and-camera module.
Figure 4:
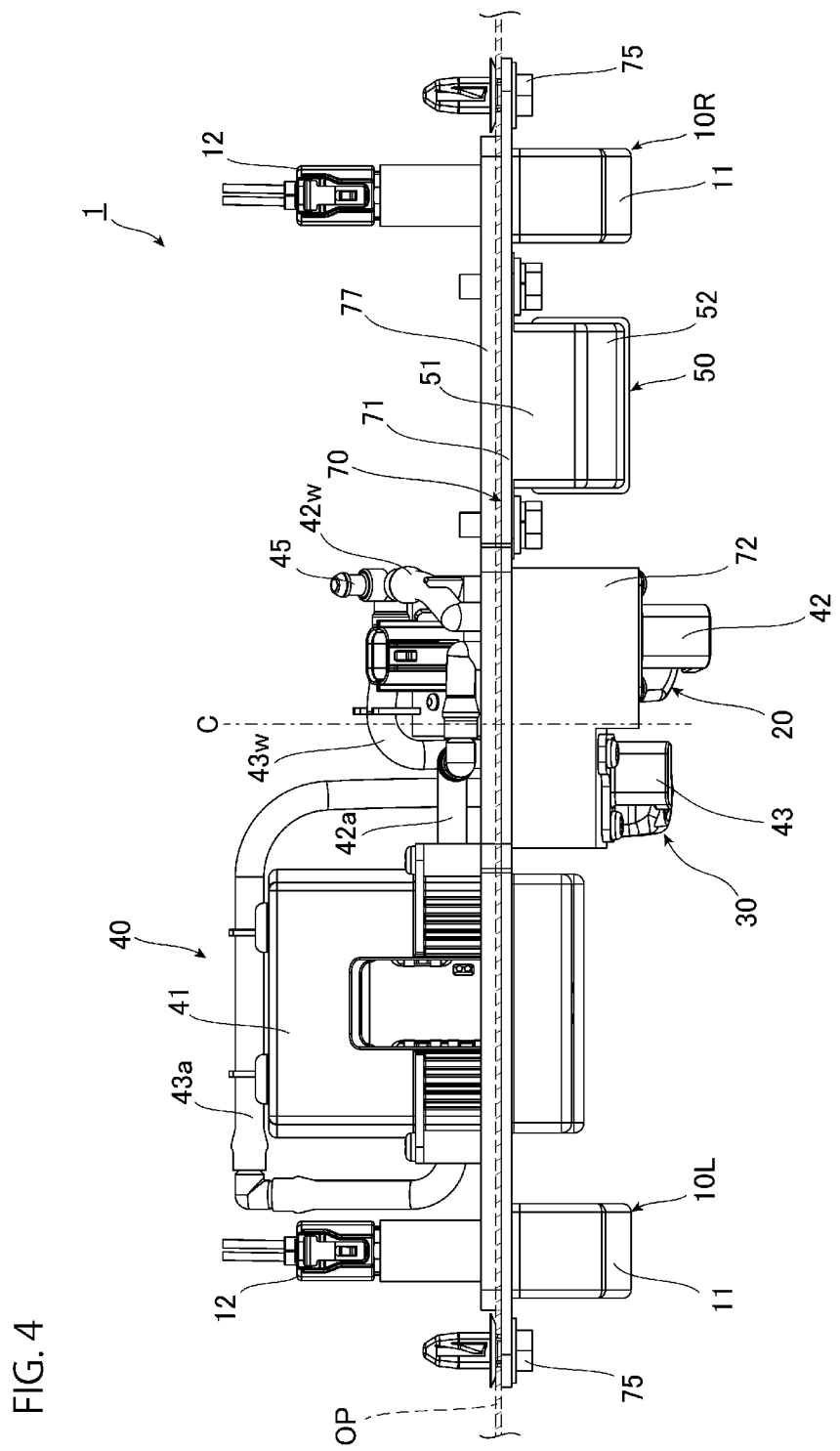
FIG. 4 is a top view of the integrated lamp-and-camera module.
Figure 5:
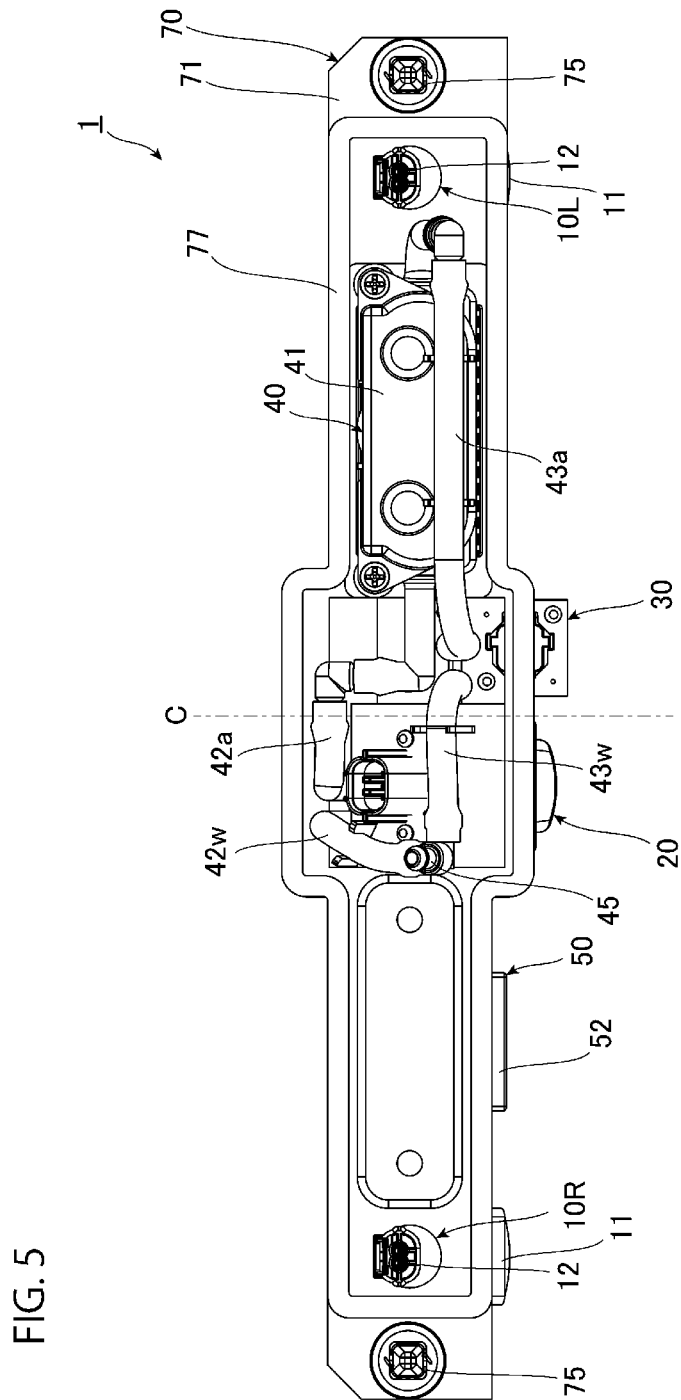
FIG. 5 is a rear view of the integrated lamp-and-camera module.

FIG. 2 is a perspective view showing the integrated lamp-and-camera module. FIG. 3 is a front view of the integrated lamp-and-camera module. FIG. 4 is a top view of the integrated lamp-and-camera module. FIG. 5 is a rear view of the integrated lamp-and-camera module. As shown in these figures, an integrated lamp-and-camera module 1 according to the present embodiment includes a pair of license plate lamps 10R and 10L, a first camera 20, a second camera 30, a cleaner 40, and an opener 50, and a housing 70 as main components.

Each of the pair of license plate lamps 10R and 10L includes a lamp cover 11, not-shown light source and lighting circuit disposed inside the lamp cover 11, and a connector 12. The light source is constituted by a light emitting diode (LED), for example. Each of the license plate lamps 10R and 10L is configured to emit light downward to apply the light to the license plate LP.

The first camera 20 is a rear view camera which captures an image of the rear side of the vehicle VE when the vehicle VE moves backward, and includes a housing 21 and a lens 22 held by the housing 21. According to the present embodiment, the lens 22 faces obliquely downward on the rear side of the vehicle VE. The first camera 20 captures an image of a rear ground and a rear situation of the vehicle VE at a relatively wide viewing angle when the vehicle VE moves backward. The captured image is projected on a monitor provided in an interior of the vehicle VE. Note that the first camera 20 may also capture an image of the rear situation on occasions other than the backward movement of the vehicle VE.

The second camera 30 is a rear view camera disposed in line with the first camera 20, and captures an image of the rear situation of the vehicle VE when the vehicle VE moves forward, and includes a housing 31 and a lens 32 held by the housing 31. According to the present embodiment, the second camera 30 is a camera which captures an image of the rear side of the vehicle VE in a region visually recognizable by a rearview mirror and side mirrors. Accordingly, the second camera 30 is a camera provided for the purpose of capturing a farther image on the rear side of the vehicle VE than the image of the first camera 20. Therefore, the lens 32 faces upward more than the lens 22 of the first camera 20 on the rear side of the vehicle VE. The second camera 30 captures an image at a narrower viewing angle than that of the first camera 20. The image captured by the second camera 30 is projected on the monitor provided in the interior of the vehicle VE. Note that the second camera 30 may also capture an image of the rear situation on occasions other than the forward movement of the vehicle VE.

The cleaner 40 has a pump 41, blowout portions 42, 43, and pipes 42a, 42w, 43a, 43w, and 45.

The pump 41 is a pump for feeding air, and is disposed on the side opposite to the first camera 20 with respect to the second camera 30. The pump 41 has a mechanism for feeding air to two systems. Pipes 42a and 43a are connected to the pump 41. Accordingly, the pump 41 can feed air separately to each of the connected pipe 42a and pipe 43a.

According the present embodiment, one end of the pipe 42a is connected to the second camera 30 side of the pump 41, while the other end is disposed in the vicinity of the first camera 20. A blowout portion 42 is connected to the other end of the pipe 42a. The blowout portion 42 is disposed above the second camera 30. Air from the pipe 42a is blown from a blowout port of the blowout portion 42. This air is applied to the lens 22 which is an imaging surface of the first camera 20.

According to the present embodiment, one end of the pipe 43*a* is connected to the pump 41 on the side opposite to the second camera 30, while the other end extends through the rear of the pump 41 and reaches the vicinity of the second camera 30. The blowout portion 43 is connected to the other end of the pipe 43*a*. The blowout portion 43 is disposed above the second camera 30. In this configuration, air from the pipe 43*a* is blown from a blowout port of the blowout portion 43, and blown onto the lens 32 which is an imaging surface of the second camera 30.

The pipe 45 is a pipe through which water flows, and receives supply of water at a predetermined pressure from a not-shown pump. In addition, the pipes 42*w* and 43*w* are connected to the pipe 45. The pipe 42*w* is connected to the blowout portion 42, while the pipe 43*w* is connected to the blowout portion 43. Accordingly, at least either air or water is blown from the blowout port of the blowout portion 42 toward the imaging surface of the first camera 20, and at least either air or water is blown from the blowout port of the blowout portion 43 toward the imaging surface of the second camera 30.

The opener 50 is a member for opening the trunk lid TL of the vehicle VE, and includes a housing 51 and a button 52. When the button 52 is pressed, a lock mechanism is unlocked by an internal mechanism linked to a lock mechanism provided on the trunk lid TL.

The housing 70 is a member extending in the left-right direction of the vehicle VE. The pair of license plate lamps 10R and 10L, the first camera 20, the second camera 30, the cleaner 40, and the opener 50 described above are attached to the housing 70. The housing 70 chiefly includes a plate-shaped portion 71 having a substantially flat plate shape, as a portion to which the pair of license plate lamps 10R and 10L, the cleaner 40, and the opener 50 are attached. The housing 70 further includes a box-shaped portion 72 having a substantially box shape, as a portion to which portion the first camera 20 and the second camera 30 are attached.

The plate-shaped portion 71 includes openings formed at attachment positions of the pair of license plate lamps 10R and 10L, the cleaner 40, and the opener 50. These members penetrate through the corresponding openings to be fixed to the plate-shaped portion 71. In this state, light emitting elements of the respective license plate lamps 10R and 10L are positioned on the front surface side of the housing 70, while the connectors 12 of the license plate lamps 10R and 10L and the pipes 42*a*, 42*w*, 43*a*, 43*w*, and 45 of the cleaner 40 are positioned on the rear surface side of the housing 70. Moreover, the first camera 20 and a part of the second camera 30 are disposed in a space of the box-shaped portion 72. In addition, the imaging surfaces and the like of the first camera 20 and the second camera 30 are exposed through an opening formed in the box-shaped portion 72 toward the front surface side of the housing 70. As described above, the first camera 20 captures an image at a wider viewing angle than that of the second camera 30. Accordingly, the first camera 20 and the second camera 30 are attached to the housing 70 such that the imaging surface of the first camera 20 protrudes rearward from the imaging surface of the second camera 30 as shown in FIG. 4. Moreover, in the space of the box-shaped portion 72, the pipes 42*a* and 42*w* are connected to the blowout portion 42, the pipes 43*a* and 43*w* are connected to the blowout portion 43, and a portion including the blowout ports of the blowout portions 42 and 43 is exposed through the opening formed in the box-shaped portion 72.

A bolt 75 is attached to each of left and right ends of the housing 70. Each of the bolts 75 is a member for fixing the housing 70 to an outer panel OP included in the vehicle VE and virtually indicated by hatching in FIG. 4. In a state that the respective members are attached to the housing 70 as described above, the first camera 20, the second camera 30, the pump 41, and the opener 50 are disposed between the pair of license plate lamps 10R and 10L. Furthermore, the first camera 20 and the second camera 30 are disposed on the one and the other sides opposite to each other, respectively, with respect to a center line C in the left-right direction of the housing 70. According to the present embodiment, the first camera 20 and the second camera 30 are disposed at substantially the same distance from the center line C.

Figure 6:
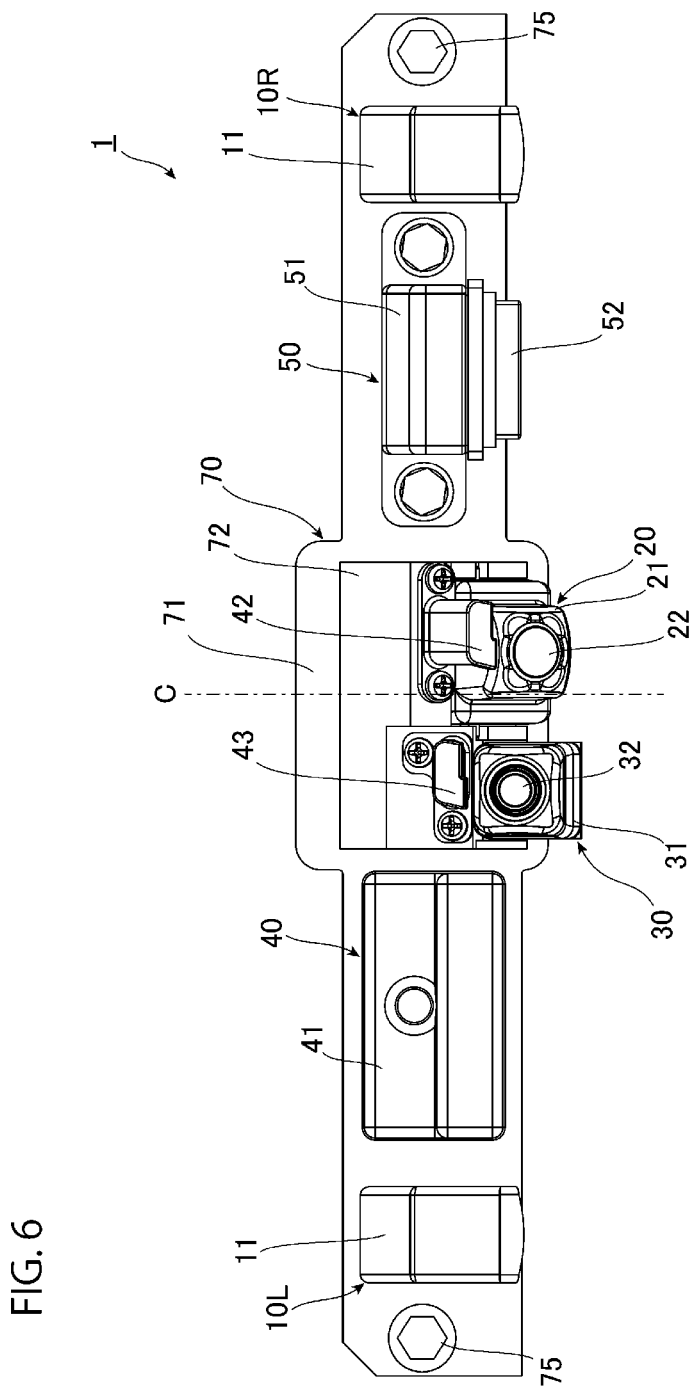
FIG. 6 is a rear view of the integrated lamp-and-camera module according to a modified example.

Unlike the present embodiment, the first camera 20 may be disposed closer to the center line C than the second camera 30 is as shown in FIG. 6. FIG. 6 referred to herein is a rear view of an integrated lamp-and-camera module according to a modified example. As described above, the first camera 20 is a camera which captures an image of the rear side when the vehicle VE moves backward, and therefore is provided for the purpose of capturing an image of a region closer to the vehicle VE than the image captured by the second camera 30. Accordingly, a sense of discomfort is more easily given by the image projected by the first camera 20 as the distance between the first camera 20 and the center line C increases. For example, indications such as marks formed on the ground and curbs to indicate a parking position are located at asymmetrical positions in the left-right direction during parking of the vehicle VE by backward movement. In this case, an occupant is likely to feel uncomfortable. On the other hand, when the second camera 30 provided to capture a farther image from the vehicle VE than the image of the first camera 20 is disposed at a long distance from the center line C, the occupant is less likely to feel uncomfortable than in the case where the first camera 20 is disposed at a long distance from the center line C. In view of this point, the first camera 20 may be disposed closer to the center line C than the second camera 30 is, or the second camera 30 may be disposed away from the center line C with the first camera 20 disposed on the center line C.

According to the present embodiment, a seal 77 is further disposed on the rear surface side of the housing 70. As shown in FIG. 5, the seal 77 is made of an elastic member such as rubber, and covers the respective members disposed in the housing on the rear surface of the housing 70. The seal 77 interposed between the outer panel OP of the vehicle VE and the housing 70 prevents entrance of water and dust through a gap between the outer panel OP and the housing 70 toward the rear surface side of the housing 70. Note that FIG. 4 is a schematic diagram showing an arrangement position of the outer panel OP, therefore the seal 77 and the outer panel OP depicted in the figure overlap with each other.

The integrated lamp-and-camera module 1 configured as above is disposed substantially at the center of the rear surface of the vehicle VE in the left-right direction as shown in FIG. 1. In this state, the pair of license plate lamps 10R and 10L are disposed above the license plate LP of the vehicle VE in the left-right direction, and applies light to the license plate LP as shown in FIG. 2. Moreover, the license plate LP tends to be disposed at the center of the vehicle in the left-right direction as described above. In this case, the integrated lamp-and-camera module 1 also tends to be attached to the center of the vehicle VE in the left-right direction. Accordingly, in the state that the integrated lamp-and-camera module 1 is attached to the vehicle VE as shown in FIG. 1, the center line C is located substantially at the center of the vehicle VE in the left-right direction. According to the present embodiment, therefore, the first camera 20 and the second camera 30 are disposed on one and the other sides opposite to each other, respectively, with respect to the center of the vehicle VE in the left-right direction. When the first camera 20 is disposed closer to the center line C than the second camera 30 is as described above, the first camera 20 is located closer to the center of the vehicle VE in the left-right direction than the second camera 30 is.

As described above, the integrated lamp-and-camera module 1 of the present embodiment includes the pair of license plate lamps 10R and 10L, the first camera 20 and the second camera 30 disposed between the pair of license plate lamps 10R and 10L and constituting rear view cameras for capturing an image of the rear side of the vehicle, and the housing 70 to which the respective license plate lamps 10R and 10L and the first camera 20 and the second camera 30 are attached, as a housing attached to the vehicle body.

According to the integrated lamp-and-camera module 1 thus configured, the housing 70 to which the pair of license plate lamps 10R and 10L, the first camera 20, and the second camera 30 are attached can be attached to the vehicle body. Accordingly, as compared with a configuration which separately attaches the pair of license plate lamps 10R and 10L and the first camera 20 and the second camera 30 to the main body of the vehicle VE, attachment of the license plate lamps 10R and 10L, and the first camera 20 and the second camera 30 constituting the rear view camera to the body of the vehicle VE can be facilitated.

Moreover, the first camera 20 and the second camera 30 are disposed between the pair of license plate lamps 10R and 10L according to the present embodiment. In this case, the two rear view cameras are allowed to be disposed in the vicinity of the central portion of the housing 70. In addition, the first camera 20 and the second camera 30 are disposed on the housing 70 on one and the other sides opposite to each other, respectively, with respect to the center line C in the left-right direction. In this case, the first camera 20 and the second camera 30 can be located at positions closer to the center of the vehicle VE in the left-right direction than in a case where both the first camera 20 and the second camera 30 are disposed on one side with respect to the center line C. Accordingly, a difference between an image captured by the first camera 20 and an image captured by the second camera 30 can be reduced.

Furthermore, according to the embodiment described above, the pump 41 of the cleaner 40 for feeding air to the blowout ports of the blowout portions 42 and 43 is attached between the pair of license plate lamps 10R and 10L in the housing 70. In this case, the distance between the pump 41 and the air blowout ports can be reduced, in which condition a pressure loss of air in pipes connecting the pump 41 and the blowout ports decreases. Accordingly, compression of air within these pipes decreases, therefore an appropriate amount of air can be blown out through the blowout ports. Furthermore, according to the present embodiment, the pump 41 is disposed on the side opposite to the first camera 20 with respect to the second camera 30. As described above, an image showing the rear situation of the vehicle VE and captured by the second camera 30 during forward movement of the vehicle VE can be projected on a monitor device disposed in the interior of the vehicle VE and provided in place of a rearview mirror or side mirrors. The vehicle VE moves forward in a normal condition, and moves backward only temporarily. In this case, the imaging surface of the second camera 30 tends to be cleaned more frequently than the imaging surface of the first camera 20. The pump 41 is disposed on the side opposite to the first camera 20 side with respect to the second camera 30. In this arrangement, the distance between the pump 41 and the second camera can be made smaller than that distance in the case where the pump 41 is disposed on the side opposite to the second camera 30 side with respect to the first camera 20. Accordingly, a more appropriate blowout amount can be produced for cleaning the imaging surface of the second camera 30 which is more frequently used. It is preferable to connect the pipe 43a to the second camera side of the pump 41 to produce a more appropriate blowing amount of air for cleaning the imaging surface of the second camera 30.

The present invention is not limited to the embodiment presented herein by way of example.

For example, while the first camera 20 and the second camera 30 are provided in the embodiment described above, either one of these cameras may not be eliminated, or three or more cameras may be provided.

In addition, unlike the embodiment described above, both the first camera 20 and the second camera 30 may be disposed on one side of the center line C.

Moreover, the cleaner 40 provided in the embodiment described above may be eliminated. Furthermore, in the case where the cleaner 40 is provided, only the imaging surface of a part of the rear view cameras may be cleaned, or the cleaner 40 may not be configured to blow air. In addition, when the cleaner 40 is configured to blow air in the configuration including the pump 41, the pump 41 is not required to be attached between the pair of license plate lamps 10R and 10L in the housing 70, unlike the above embodiment. However, it is preferable to attach the pump 41 between the pair of license plate lamps 10R and 10L in view of reduction of the positions of the pump 41 and the rear view cameras as described above. When the pump 41 is attached between the pair of license plate lamps 10R and 10L in this manner, the pump 41 may be disposed on the side opposite to the second camera side with respect to the first camera 20, unlike the above embodiment.

Provided according to the present invention is an integrated lamp-and-camera module which facilitates attachment of a license plate lamp and a rear view camera to a vehicle body, and is usable in the field of vehicles such as automobiles.

REFERENCE SIGNS LIST

1 . . . integrated lamp-and-camera module
10R, 10L . . . license plate lamp
20 . . . first camera (rear view camera)
30 . . . second camera (rear view camera)
40 . . . cleaner
41 . . . pump
42, 43 . . . blowout portion
50 . . . opener
70 . . . housing
71 . . . plate-shaped portion
72 . . . box-shaped portion
77 . . . seal
C . . . center line
LP . . . license plate
MO . . . molding
OP . . . outer panel
TL . . . trunk lid
VE . . . vehicle

The invention claimed is:

1. An integrated lamp-and-camera module comprising:
a pair of license plate lamps that are disposed in a left-right direction of a license plate of a vehicle, and apply light to the license plate;
at least one rear view camera that is disposed between the pair of license plate lamps, and captures an image of a rear side of the vehicle;
a housing to which the respective license plate lamps and the rear view camera are attached, the housing being attached to a vehicle body; and
a cleaner that blows air onto an imaging surface of at least the one rear view camera, wherein
the cleaner includes a pump that feeds air to a blowout port for air blowout,
the pump is attached between the pair of license plate lamps in the housing;
the at least one rear view camera includes a first camera that captures an image of a rear situation of the vehicle when the vehicle moves backward; and
in a state that the housing is attached to the vehicle body, a part of the pump is exposed to outside of the vehicle and a lens of the first camera is located at rear side with respect to a rear end of the pump and a rear end of the pair of license plate lamps.

2. The integrated lamp-and-camera module according to claim 1, wherein
the at least one rear view camera comprises two rear view cameras disposed in line with each other,
one of the rear view cameras is the first camera that captures the image of the rear situation of the vehicle when the vehicle moves backward,
the other rear view camera is a second camera that captures an image of the rear situation of the vehicle when the vehicle moves forward, and
the pump is disposed on the side opposite to the first camera with respect to the second camera.

3. An integrated lamp-and-camera module comprising:
a pair of license plate lamps that are disposed in a left-right direction of a license plate of a vehicle, and apply light to the license plate;
at least one rear view camera that is disposed between the pair of license plate lamps, and captures an image of a rear side of the vehicle; and
a housing to which the respective license plate lamps and the rear view camera are attached, the housing being attached to a vehicle body; and
a cleaner that blows air onto an imaging surface of at least the one rear view camera; wherein
the cleaner includes a pump that feeds air to a blowout port for air blowout,
the pump is attached between the pair of license plate lamps in the housing,
the at least one rear view camera comprises two rear view cameras,
one of the rear view cameras is a first camera that captures an image of a rear situation of the vehicle when the vehicle moves backward,
the other rear view camera is a second camera that captures an image of the rear situation of the vehicle when the vehicle moves forward; and
the first camera and the second camera are arrayed in a left-right direction of the housing, and the first camera is disposed closer than the second camera to a center line in the left-right direction of the housing;
in a state that the housing is attached to the vehicle body, a part of the pump is exposed to outside of the vehicle and a lens of the first camera is located at rear side with respect to a rear end of the pump and a rear end of the pair of license plate lamps.

4. An integrated lamp-and-camera module comprising:
a pair of license plate lamps that are disposed in a left-right direction of a license plate of a vehicle, and apply light to the license plate;
at least one rear view camera that is disposed between the pair of license plate lamps, and captures an image of a rear side of the vehicle;
a housing to which the respective license plate lamps and the rear view camera are attached, the housing being attached to a vehicle body; and
a cleaner that blows air onto an imaging surface of at least the one rear view camera, wherein
the cleaner includes a pump that feeds air to a blowout port for air blowout,
the pump is attached between the pair of license plate lamps in the housing
the at least one rear view camera includes a first camera that captures an image of a rear situation of the vehicle when the vehicle moves backward, and
in a state that the housing is attached to the vehicle body, a part of the pump is exposed to outside of the vehicle and a lens of the first camera is located at rear side with respect to a rear end of the pump and a rear end of the pair of license plate lamps.

* * * * *